INVENTOR
ANTHONY D. GARGOLINSKI
ATTORNEYS

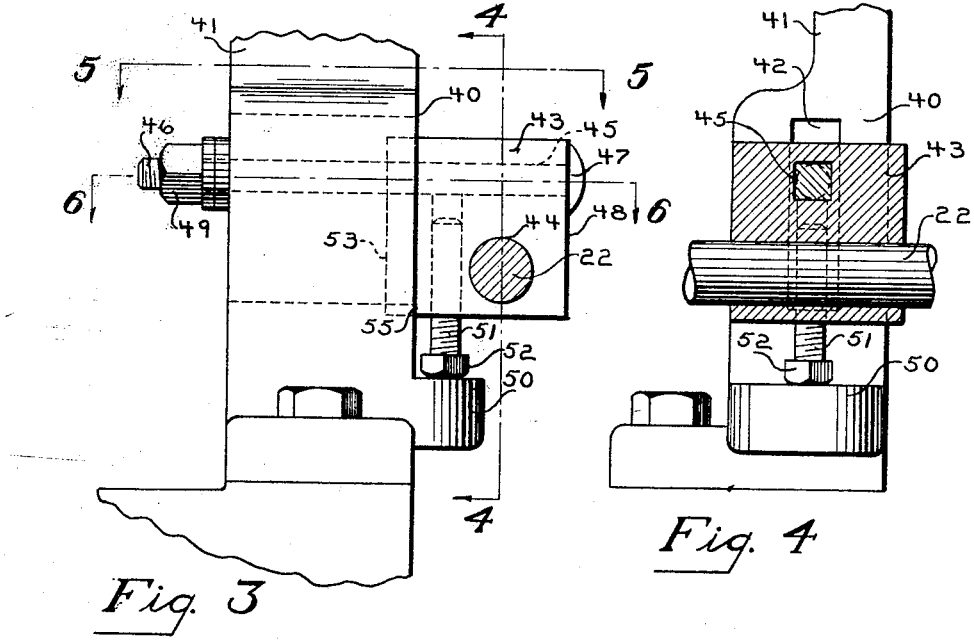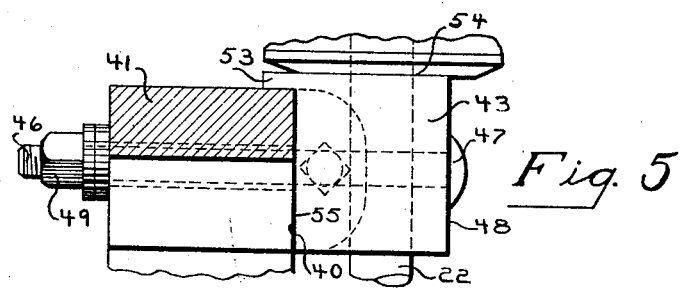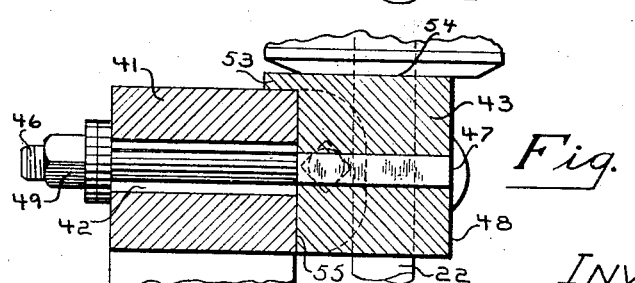

Patented June 23, 1931

1,811,431

UNITED STATES PATENT OFFICE

ANTHONY D. GARGOLINSKI, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS

DOBBY FOR LOOMS

Application filed April 23, 1929. Serial No. 357,544.

This invention relates to improvements in loom dobbies and it is the general object of the invention to provide an improved mounting for the pattern chain cylinder.

As heretofore constructed the pattern chain cylinders of dobbies have been mounted in bearings suspended from a portion of the dobby frame located above the pattern cylinder. I have found as a result of considerable experience with dobbies of this construction that it is a difficult matter to keep the cylinder in proper position because of the fact that the bearing is capable of a movement toward the pivotal support of the dobby fingers. When the bearings move away from the pivot of the fingers the pegs are not able to lift the fingers sufficiently to give the proper downward motion on the part of the hooks. Under these conditions the hooks may be cammed upwardly by the knives of the dobby. In order to remedy this condition it is an important object of my present invention to provide the dobby with a bearing which is so constructed and mounted on the dobby frame that it cannot move toward the pivotal support for the dobby fingers.

It has also been common practice heretofore to employ cylinder bearings with feet the planes of which are perpendicular to the axis of the cylinder. There are two bearings for the cylinder, one on each side of the dobby and with the construction heretofore employed if one bearing is slightly higher than the other its axis will lie above the axis of the other bearing. As a result when the cylinder is inserted in the bearings the latter cramp and prevent free rotation. It is necessary under these conditions to spend time in adjusting the bearings so that they are coaxial. It is an important object of my present invention to provide a form of bearing wherein the axes of the bearings can be readily aligned even though one bearing be slightly above the other. This result I accomplish as shown herein by providing the bearing with a dobby frame engaging face which is substantially parallel to the axis of the dobby cylinder. In this way the bearing can turn in the plane in which the axis of the cylinder lies, thus making it posible to align both bearings with the axis of the dobby cylinder.

Dobby cylinders are usually made with either six or eight spaces to accommodate the bars of the dobby chain. The bars are usually of the same width so that the cylinders having eight spaces are of a larger diameter than those having six spaces. It is necessary, therefore, to provide for accommodating cylinders of two different diameters and it is a further object of my present invention to provide a bearing block and a mounting for the same which will permit the cylinder bearings to be moved a sufficient amount so that cylinders of either six or eight spaces may be employed in the same bearings.

With these and other objects in view which will appear as the description proceeds, my invention resides in the combination and arrangement of parts hereinafter described and set forth in the claims.

In the accompanying drawings wherein I have set forth a convenient embodiment of my invention, Fig. 1 is a rear elevation of the lower portion of the dobby provided with my improved form of bearing, Fig. 2 is an end elevation taken in the direction of arrow 2, Fig. 1, Fig. 3 is an enlarged vertical section taken on line 3—3 of Fig. 2.

Fig. 4 is a vertical section taken on line 4—4 of Fig. 3,

Fig. 5 is a horizontal section taken on line 5—5 of Fig. 3, and

Fig. 6 is a horizontal section taken on line 6—6 of Fig. 3.

Figure 1:
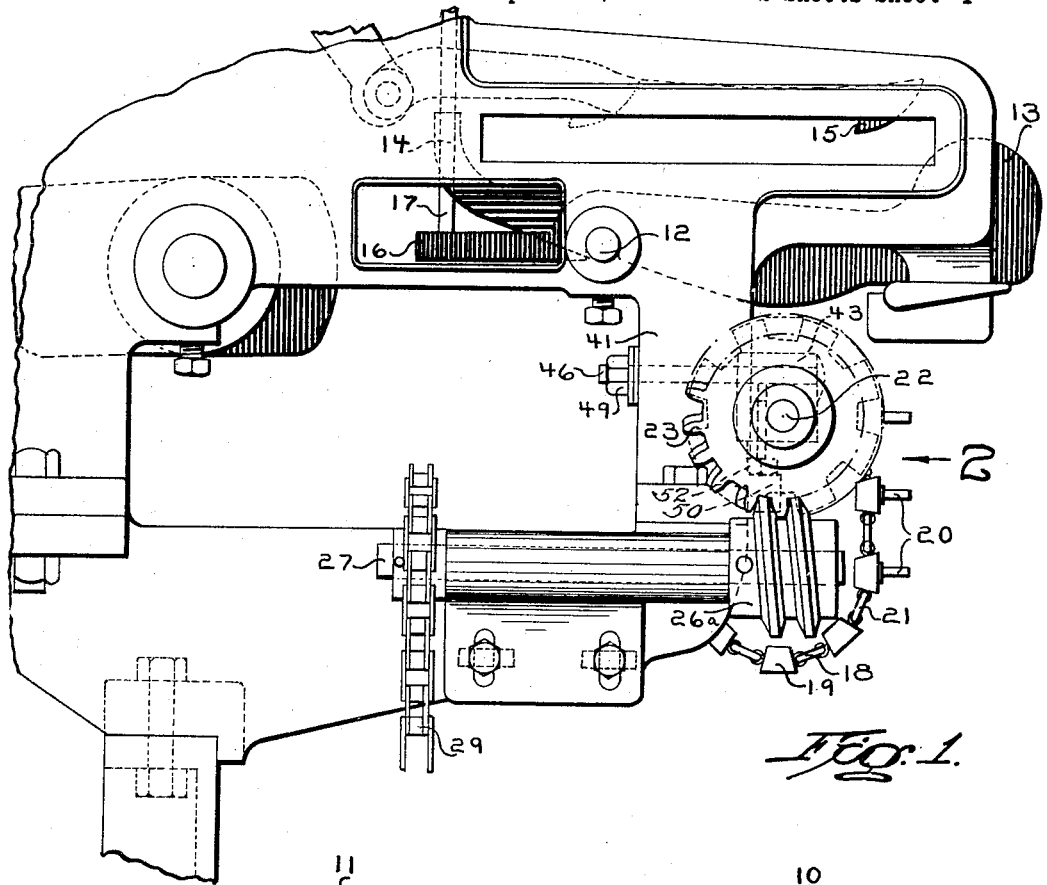
Figure 2:
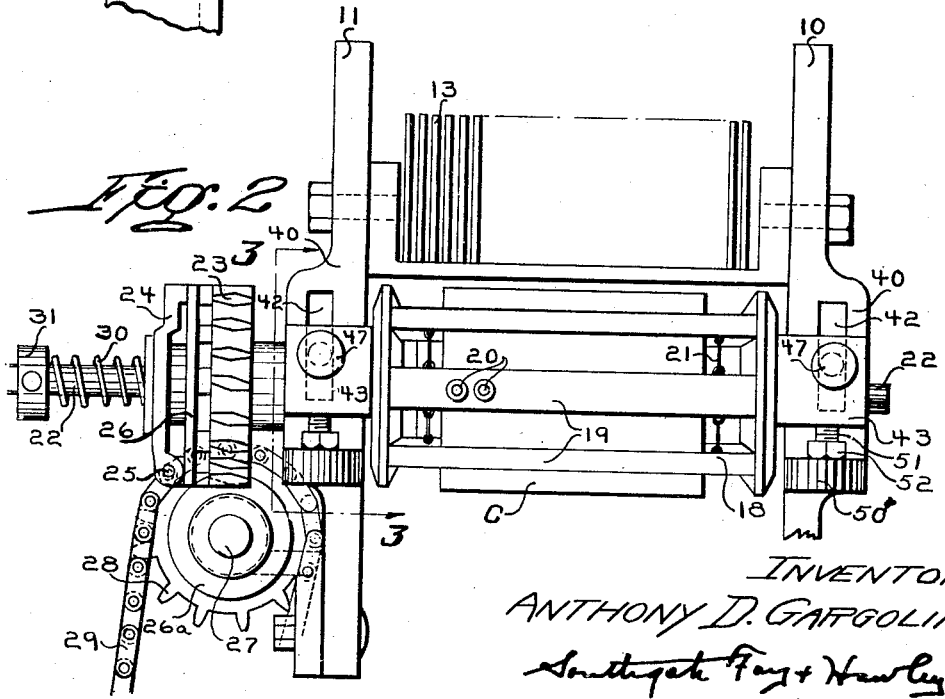

Referring particularly to Figs. 1 and 2 I have shown a dobby having front and rear side plates 10 and 11, respectively, between which extends a finger supporting rod 12. A set of dobby fingers 13 are pivoted on the rod, certain of said fingers having upturned ends 14 adapted for direct engagement with the lower hooks 15, while other of the fingers are provided with horizontal extensions 16 which cooperate with lifting rod 17 to control the upper hooks of the dobby not shown.

In order to actuate the fingers there may be provided the usual dobby chain 18 having bars 19 provided with pegs 20. The bars are connected together by links 21 and the cylinder C is mounted on and secured to shaft 22.

The rear end of the shaft is provided with a worm gear 23 which is loose with respect to the shaft but has engagement with a driving finger 24 pivoted as at 25 to a collar 26 fast on the shaft. A worm 26a mounted on a lower shaft 27 extending transversely with respect to the shaft 22 is driven by a sprocket 28 actuated by chain 29. A compression spring 30 is interposed between finger 24 and a collar 31 which is fastened to the shaft 22.

Under normal conditions the rotation of shaft 27 will cause movement of the worm 23 which in turn will cause the finger 24 to rotate. The latter is held against angular movement with respect to the shaft 22 so that when the parts are properly related the worm 23 acting through arm 24 will cause rotation of the cylinder C, thereby advancing the chain 18.

The matter thus far described is of common construction and forms no part of my present invention, the dobby illustrated being of the usual type having oppositely reciprocating knives which engage hooks to lift the harness frames.

My present invention relates to the manner of mounting the cylinder C and the shaft 22 therefor. In carrying my invention into effect I provide the dobby plates 10 and 11 with vertical engaging surfaces 40 formed on spaced upright feet 41. As shown particularly in Figs. 2 and 6 each of the plates is provided with a vertical slot 42 the plane of which is perpendicular to the axis of the shaft 22. The latter is supported in bearing blocks 43 one of which is illustrated more particularly in Figs. 3 to 6. The block is provided with a bore 44 through which extends the shaft 22. Preferably above the bore is an opening 45 which may be square in cross section, said opening aligning with the slot 42 and having disposed therein a bolt 46. The latter may have a head 47 to engage the vertical surface 48 of the bearing block which is substantially parallel to the surface 40 and said bolt is of sufficient length to extend through the opening 45 and also through the slot 42, projecting beyond the foot 41 to have mounted thereon a retaining nut 49.

In order to hold the block in proper vertical adjustment I provide the foot with a lug 50 extending below the block and I thread into the latter an adjusting holding screw 51. The axis of the screw 51 is preferably though not necessarily so placed as to intersect the axis of the bolt 46. The head 52 of the screw 51 engages the lug 50 and by adjusting the position of said screw 51 the vertical location of the block may be determined. I find that by having the axis of the bolt 46 and screw 51 as described that there is no tendency for the block to turn with respect to the dobby when subjected to jar or vibration.

Each block is provided with a single bolt to hold it to the frame of the dobby, but in order to prevent objectionable angular motion of the bearing with respect to the dobby frame I provide each bearing with a fin 53 which as shown in Fig. 6 extends along one side of the foot 41 and also extends above as well as below the axis of the bolt 46. In this way the fin acts to hold the block in proper position. It is to be understood that the blocks are the same on both ends of the cylinder although I prefer to make them of opposite hands so that the fins 53 will in each instance lie on the inside of the dobby frame and thereby increase the surface 54 of the block which abuts and positions the cylinder C.

I find by the construction set forth herein that the cylinders are held against longitudinal movement, thereby insuring proper registry of the pegs with their corresponding fingers. It will also be seen that the surface 55 of the block which engages the surface 40 extends above and below the axis of the shaft 22 so that there is no possibility of the cylinder C changing to position with respect to the finger supporting rod 12. The fingers will therefore always be given the same amount of motion to insure proper engagement of the hooks with their knives. It will also be seen that because of the fact that the surface 55 is in a plane parallel to the axis of the cylinder slight angular movements of the block which may be permitted either by the fin 53 or because of the fact that the bolt 46 is not held tightly in the slot 42 will enable the block to be turned so that the axis of the bearing 44 can be made to align with the axis of the shaft 22. It is possible also of course to slide the block along the surface 40 in order to establish proper alignment between the bearings of the blocks and the shaft 22. A sliding movement of the block in a vertical direction also makes it possible to adjust the dobby so that the same can operate with a cylinder having either six or eight bar engaging spaces, the screw 51 being adjusted to hold the block in position when either of these types of cylinders is used.

From the foregoing it will be seen that I have provided a very simple form of bearing for dobby cylinder wherein the cylinder is held against relative movement with respect to the axes of the dobby fingers by engagement of the bearing block and dobby frame along surfaces which are substantially parallel to the axis around which the dobby fingers and cylinder rotates. It will also be seen that by reason of the construction set forth herein it is a simple matter to align the bearings of the blocks with the shaft of the cylinder. It will further be noted that the fin 53 acts to prevent objectionable angular movement of the bearing blocks with respect to the dobby frame, this fin making it possible to hold each block in position by means of a single bolt. It will further be noted that the screw 51 acts to hold the block in proper position to prevent the same from downward motion and the axes of the said screw and bolt 46 preferably pass through a common point so that there is no movement acting to twist the bearing with respect to the dobby frame under action of the vibration incident to the running of the loom.

Having thus described my invention it will be seen that changes and modifications may be made therein by those skilled in the art without departing from the spirit and scope of the invention and I do not wish to be limited to the details herein disclosed, but what I claim is:

1. In a loom dobby having a set of dobby fingers pivotally mounted on a transverse support, a pattern chain cylinder under the fingers having an axis substantially parallel to the support, a pair of spaced feet, one on each side of the fingers, each foot having a slot therein the plane of which is substantially perpendicular to the axis of the cylinder, each foot also having a main bearing surface substantially parallel to the axis of the cylinder and an auxiliary surface at an angle to the main surface, bearing blocks in which the cylinder is rotatably mounted, holding means for the blocks passing through the slots and movable in the latter to place the blocks in different positions relatively to the fingers, said blocks having surfaces parallel to the axis of the cylinder and engaging the said bearing surfaces, said blocks having fins parallel to the slots to engage the auxiliary surfaces, and means to hold the blocks against the bearing surfaces.

2. In a loom dobby having a set of dobby fingers pivotally mounted on a transverse support, a pattern chain cylinder under the fingers having an axis substantially parallel to the support, spaced feet forming part of the dobby and having aligning vertical bearing surfaces parallel to the axis of the cylinder, lugs formed on the lower parts of the feet, bearing blocks in which the cylinder is rotatably mounted, said blocks having surfaces parallel to the axis of the cylinder and engaging the said bearing surfaces, adjusting and supporting devices in the blocks to engage the lugs and determine the vertical position of the cylinder, and means to hold the blocks against the bearing surfaces.

3. In a loom dobby having a set of dobby fingers pivotally mounted on a transverse support, a pattern chain cylinder under the fingers having an axis substantially parallel to the support, spaced feet forming part of the dobby and having aligning vertical bearing surfaces parallel to the axis of the cylinder, lug members formed one on each foot at the lower part thereof, bearing block members in which the cylinder is rotatably mounted, said block members having surfaces parallel to the axis of the cylinder and engaging said bearing surfaces, means carried by one of said members and adjustable toward and from the fingers to engage the other member and vary the position of the block members relatively to the lug members, and means to hold the blocks against the bearing surfaces.

4. In a loom dobby having a set of dobby fingers pivotally mounted on a transverse support, a pattern chain cylinder under the fingers having an axis substantially parallel to the support, spaced feet forming part of the dobby and having aligning vertical bearing surfaces parallel to the axis of the cylinder, lug members formed one on each foot at the lower part thereof, bearing block members in which the cylinder is rotatably mounted, said block members having surfaces parallel to the axis of the cylinder and engaging said bearing surfaces, means carried by one of said members and adjustable toward and from the fingers to engage the other member and vary the position of the block members relatively to the lug members, and a single securing element for each block member passing through the latter and having holding engagement with the foot adjacent thereto, the axis of the securing element being perpendicular to the axis of the cylinder and intersecting the axis of the said adjusting means carried by one of the members.

5. In a loom dobby having a set of dobby fingers pivotally mounted on a transverse support, a pattern chain cylinder under the fingers having an axis substantialy parallel to the support, spaced feet forming part of the dobby and having aligning vertical bearing surfaces parallel to the axis of the cylinder, a lug member for the lower part of each of the feet, a bearing block member for each end of the cylinder, said block members having surfaces parallel to the axis of the cylinder and engaging the said bearing surfaces, an adjusting and supporting device for each end of the cylinder, each device supported by one member and engaging the adjacent member to determine the vertical position of the cylinder, and means to hold the block members against the bearing surfaces.

In testimony whereof I have hereunto affixed my signature.

ANTHONY D. GARGOLINSKI.